United States Patent

Kim et al.

[11] Patent Number: 5,407,981
[45] Date of Patent: Apr. 18, 1995

[54] METHOD FOR THE PREPARATION OF COPOLYESTER ELASTOMER HAVING HIGH VISCOSITY

[75] Inventors: Kwang T. Kim; Dae W. Ihm; Moon S. Beak; Young C. Lee, all of Kyungsan, Rep. of Korea

[73] Assignee: Cheil Synthetics Inc., Kyungsan, Rep. of Korea

[21] Appl. No.: 94,959

[22] Filed: Jul. 23, 1993

[30] Foreign Application Priority Data

Dec. 26, 1992 [KR] Rep. of Korea .................. 25555

[51] Int. Cl.$^6$ .............................. C08K 5/41
[52] U.S. Cl. ................................. 524/81; 528/176; 528/191; 528/194; 528/195; 528/272; 528/275; 528/295; 528/301; 528/302; 525/437; 525/444
[58] Field of Search ............... 528/272, 275, 295, 301, 528/302, 126, 191, 194, 195; 525/437, 444; 524/81

[56] References Cited

U.S. PATENT DOCUMENTS

4,295,652 10/1981 Saito et al. .......................... 273/235
5,073,455 12/1991 Nose et al. ........................ 428/411.1

OTHER PUBLICATIONS

CA116(26):256293r; CA96(26):219463u; CA106(2):6380c; CA80(16):84567c.

*Primary Examiner*—Samuel A. Acquah
*Attorney, Agent, or Firm*—Nikaido, Marmelstein Murray & Oram

[57] ABSTRACT

A method for preparation of a polyether-ester elastomer. The method comprises admixturing dibasic acid with short chain diol for the formation of a short chain ester monomer represented :into general formula (I) and with polyglycol for the formation of a long chain ether moromet represented into general formula (II), adding the alkali salt of dialkylsufoisophthalate to the admixture to react the admixture until the discharge of methanol is tip to above 70%, adding stabilizing agent to perform the polymerization reaction, and then, blending phenolic alkali metal salt.

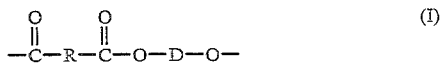

(I)

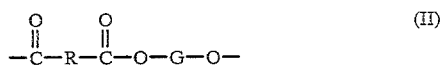

(II)

wherein R is a biradical obtained by removing carboxyl group from a dicarboxylic acid having a molecular weight not more than 400, D is a biradical obtained by removing hydroxyl group from a short chain diol having a molecular weight not more than 250, and G is a biradical obtained by removing hydroxyl group from a long chain ether glycol having a molecular weight of a range of about 400 to 4,000.

8 Claims, No Drawings

METHOD FOR THE PREPARATION OF COPOLYESTER ELASTOMER HAVING HIGH VISCOSITY

BACKGROUND OF THE INVENTION

1. Field of the Invention

The present invention relates to a method for the preparation of polyether-ester elastomer and in particular, to a method for the production of polyether-ester elastomer having high cure rate, good melting viscosity and other excellent properties suitable for extrusion and blow moldings.

2. Description of the Prior Art

As known to those skilled in the art, thermoplastic polyether-ester elastomers are block copolymers wherein rubber-like polyether soft segments and plastic polyester hard segments are alternately linked to one another, so that they typically have excellent rubber-like properties such as low-temperature durability, flexibility, elastic recovery (elasticity) and etc., each caused by the soft segments, and excellent plastic properties such as mechanical strength, heat resistance, low-temperature resistance, moldability and the like, each caused by the hard segments. Such polyether-ester elastomers are thus useful for (flexible) hoses, belts, industrial elements, sport articles and etc.

However, it is known that these polyether-ester elastomers are not suited to a blow molding due to their low melt strength, furthermore, in case of high content of soft segments they have serious disadvantages in moldability caused by low cure rate thereof.

For solving these problems, there have been proposed several methods for improving the melt strength and the cure rate of the polyether-ester elastomer, for example, blending of butadiene/acrylonitrile, that is, nitrile rubber (NBR), a class of nitrile copolymers, with the elastomers, and addition of ethylene/methacrylic acid ionomer, a class of polymerized carboxylate, to the elastomers. However, these methods have a disadvantage in that, they cause occurrence of a phase separation in the elastomers during the molding method, while they efficiently improve the melt strength of the elastomers. In addition, aliphatic alkaline salts may be added to the elastomers to make them have improved melt strength and cure rate. However, this method is not preferred for practical use since it detrimentally affects the melt stability of the elastomers.

In another method, crosslinking of the elastomer may be achieved using primary amine or secondary amine as a crosslinking agent, thus improving the melt strength of the elastomers. However, this method shows a disadvantage in that it causes a problem in moldability of the elastomer because it reduces the cure rate of the elastomer.

SUMMARY OF THE INVENTION

Accordingly, in an aspect of the present invention, there is provided a method for the production of polyether-ester elastomer which is suitable to extrusion and blow molding.

In another aspect of the present invention, there is provided polyether-ester elastomer which has an improved melting strength, a viscosity and a crystallizing rate and is capable of being applied for molding the parison with large diameter thereof.

In accordance with this invention, the polyether-ester elastomer is prepared by admixing dibasic acid with a short chain diol for the formation of a short chain ester monomer represented into general formula (I) and with a polyglycol for the formation of a long chain ether monomer represented into general formula (II), adding the alkali salt of dialkylsufoisophthalate to the admixture to react the admixture until the discharge of methanol is up to about 70%, adding stabilizing agent to perform the polymerization reaction, and then, blending phenolic alkali metal salt.

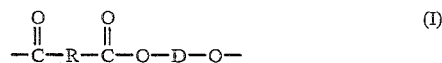

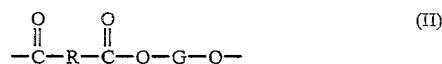

wherein R is a biradical obtained by removing carboxyl group from a dicarboxylic acid having a molecular weight not more than 400, D is a biradical obtained by removing hydroxyl group from a short chain diol having a molecular weight not more than 250, and G is a biradical obtained by removing hydroxyl group from a long chain ether glycol having a molecular weight of a range of about 400 to 4,000.

To the accomplishment of the foregoing and related objects, this invention comprises the features of improvement hereafter fully described and the following description setting forth in detail certain illustrated embodiments of the invention.

DETAILED DESCRIPTION OF THE INVENTION

The present invention will become more apparent as the following description proceeds.

The polyether-ester elastomer according to the present invention consists of about 10 to 75% by weight of ether monomer of long chain and about 20 to 90% by weight of ester monomer of short chain, the polyester of short chain consisting of dibasic acid and diol of short and the polyether of long chain consisting of dibasic and aliphatic polyglycol.

The dibasic acid used in the present invention is selected from a group comprising terephthalic acid, isophthalic acid, naphthalene dicarboxylic acid, adipic acid and sebacic acid. The diol of short chain used in the present invention is a low molecular weight diol (having a molecular weight less than 250) having about 2 to 15 carbon atoms, for example, ethylene glycol, propylene glycol, 1,4-butane diol, pentamethylene glycol, decamethylene glycol, 1,6-hexane diol, cyclohexane dimethane diol and the like.

The aliphatic polyglycol used in the present invention is selected From polyethylene glycol, polyisopropylene glycol, polytetramethylene glycol and etc., and this polyglycol typically has a molecular weigh of a range of about 400 to 4,000 and about 0.02 to 0.3 mole of polyglycol is added to 1 mole of dicarboxylic acid.

The polyether-ester elastomer according to this invention has a repeated monomer of the formulas (I) and (II)

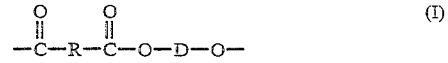

-continued

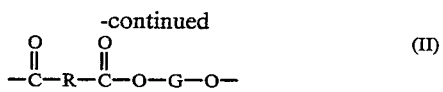

The formula (I) is of the short chain ester hard segment for providing the final elastomer with good mechanical properties, while the formula (II) is of the long chain ether soft segment for providing the final elastomer with good elasticity and flexibility. In the formulas (I) and (II), R is a residual biradical obtained by removing carboxyl group from the dicarboxylic acid having a molecular weight not more than 400, D is a residual biradical obtained by removing hydroxyl group from the short chain diol, and G is a residual biradical obtained by removing hydroxyl group from the long chain ether glycol having a molecular weight of a range of about 400 to 4,000.

As aforementioned, the method of this invention provides the polyether-ester elastomer which is suitable for the extrusion and blow moldings because of its increased cure rate and improved melt viscosity. In this method, alkali metal salt of dialkylsulfoisophthalate, an ionic compound, and phenolic alkali metal salt are added to polyether-ester elastomer solution. The alkali metal salt of dialkylsulfoisophthalate is represented as shown in following formula (III).

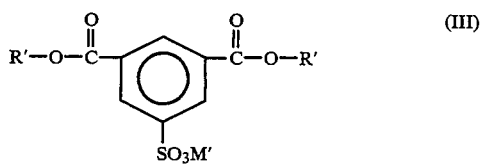

wherein R' is an alkyl having 1 to 4 of carbon number, methyl being most preferable, M' is an alkali metal such as lithium, sodium, potassium, rubidium and cesium, sodium being most preferable.

The alkali metal salt of dialkylsulfoisophthalate is added in amount of about 0.1 to 15 mole % as based on the dibasic acid of the elastomer and preferably about 0.1 to 5 mole % at a view of melt index, melting temperature and crystallizing temperature.

The phenolic alkali metal salt used in the present invention is alkali metal salt bonded to phenolic compound having more than one hydroxyl group and is represented as shown in following formula (IV).

wherein $R^2$ is an aromatic compound such as benzene, naphthalene, anthracene and phenanthrene of an aromatic compound directly bonded to a benzene ring, m and n is an integer of 0 to 5, respectively, the sum thereof being not exceed 5, $R^3$ is a substituent for the hydrogen of $R^2$ that comprises alkyl, aryl and halogen, and $M^2$ is an alkali metal such as sodium and potassium.

The representative phenol compound is ortho-cresol, meta-cresol, para-chlorophenol, para-phenylphenol, para-cyclohexylphenol, hydroquinone catechol, resorcinol, pyrogaltol, alpha-naphthol, beta-naphthoi or the like. Representative phenolic compounds are ortho-cresol, meta-cresol, para-chlorophenol, para-phenylphenol, para-cyclohexylphenol, hydroquinone, catechol, resorcinol, pyrogaltol, alpha-naphthol, and beta-naphthol.

In addition, monohydric phenol generally causes environmental pollution so that polyhydric phenol is used in this invention. On the other hand, the phenolic alkali metal shows effective result when it has a concentration of about 0.05 to 10 percent by weight as based on the elastomer.

Also, photo-stabilizer, antioxidant, and catalyst may be added to prepare the present elastic polymer. In the present invention, tetrabutyltitanate and magnesium acetate are used alone or in combination thereof. The catalyst is selected from organic titanate, organic magnesium salt and the like, especially tetrabuthyl titanate, magnesium acetate or a mixture thereof in this invention. It is more effective to determine the catalyst amount of about 0.001 to 2.0 percent by weight of the polyether-ester elastomer.

The following examples and comparative examples are merely intended to the illustrate the present invention is further detail and should by no means be considered to be limitative of the invention.

"Part" used in the following Examples means "weight part".

EXAMPLE 1

100 parts of dimethyltelephthalate, 125 parts of 1,4-butanediol, 1 mole % of sodium dimethylisophthalate as based on dimethylphthalate were input into a flask equipped with a distillation column and a stainless steel stirrer provided with a paddle having the shape of the same length as the inner radius of the flask and rotatably disposed at a position of 3 mm above the flask bottom and 75 parts of polytetramethylene glycol (average molecular weight 1,000), 0.2 part of butyltitanate slurried to 1,4-butanediol, 0.1 part of magnesium acetate were charged to the flask.

The inner temperature of the flask was slowly raised from 150° C. to 200° C. for one hour, then the discharge of methanol was measured. When the measured discharged of the methanol reached 70 percent of an ideal extraction amount, 0.1 part of tetrabutyltitanate as a catalyst, 0.4 part of 2,6-ditertbutyl- 4-methylphenol as an antioxidant, and 0.8 part of H-benzotriazole-2-yl)-4-methyl-6-dodecylphenol as a photostabilizer were added to the Flask, and a phenolic alkali metal salt and primary or secondary amine of slurry type mixed with 1,4-buthanediol were added to the flask, thereafter, the flask was heated from 150 C. to 220° C. At this time, the addition and heating were preferably carried out within about 20 minutes, otherwise the reaction after the 70 percent discharge of methanol was continued for a substantially longer time than a predetermined reaction time so that there was generated by oxidation a lot of gas in the reaction flask thereby detrimentally affected reactivity and color tone. After ester interchange reaction, the inner temperature of the reaction flask was slowly raised to 250° C. for 1 hour preferably, and the inner pressure of the flask is slowly reduced to be less than or equal to 1 mmHg. When the desired degree of polymerization was achieved, the reaction was stopped. Then, the produced polymer was output as a form of strand, which was subsequently cooled in water and sampled as a form of pellet.

The sampled pellet was dried in a dehumidification type drier at 90° C. for 1 hour to have about 400 ppm of water content. The dried pellet and 1.0% by weight of disodium hydroquinone, a phenolic alkali metal salt, as based on the pelleted elastomer were input into an extruder with twin screw to compound them at 210° to 230° C. and were extruded in 10 kg of extrudate per hour, cooled in water and sampled as a form of pellet.

The melt index of the prepared pellet was measured at 230° C. under a load of 2.16 kg using a melt indexer commercially available from Goethperd Company, Germany. The measured melt index is below 10 at 230° C. The melt viscosity of the prepared pellet was measured in ortho-chlorophenol solution of 25° C. with Weobellod type. The measured melt viscosity is about 1.0 to 2.0. Using a differential thermal analyzer. Melting temperature (Tm) and crystallization temperature (Tc) were measured to examine cure rate through Tm-Tc. At this time, after ascertaining the Tm and maintaining at a temperature which was 30° C. more than Tm to melt the polymer thoroughly, For 5 min., the temperature was cooled slowly in a rate of 20° C./min to represent an exothermic curve, the peak of which was determined to be the Tc.

Test results are given as shown in Table 1.

EXAMPLE 2

An elastomer was prepared in a manner similar to Example 1 except that dipotassium hydroquinone was used as a phenolic alkali metal salt.

Test results are given as shown in Table 1.

EXAMPLE 3

An elastomer was prepared in a manner similar to Example 1 except using disodium resorcinol as a phenolic alkali metal salt. Test results are given as shown in Table 1.

EXAMPLE 4

An elastomer was prepared in a manner similar to Example 1 except using lithium dimethylsulfoisophthalate instead of alkali metal salt of dialkylsulfoisophthalate.

Test results are given as shown in Table 1.

EXAMPLE 5

An elastomer was prepared in a manner similar to Example 1 except using potassium dimethylsulfoisophthalate instead of alkali metal salt of dialkylsulfoisophthalate, Test results are given as shown in Table 1.

COMPARATIVE EXAMPLE 1

An elastomer was prepared in a manner similar to Example 1 except that alkali metal salt of dialkylsulfoisophthalate and phenolic alkali metal salt were not used.

Test results are given as shown in Table 1.

COMPARATIVE EXAMPLE 2

An elastomer was prepared in a manner similar to Example 1 except that alkali metal salt of dialkylsulfoisophthalate were not used.

Test results are given as shown in Table 1.

COMPARATIVE EXAMPLE 3

An elastomer was prepared in a manner similar to Example 1 except that phenolic alkali metal salt were not used.

Test results are given as shown in Table 1.

TABLE 1

| | Melt* Index (g/10 min.) | Melting Temp. (°C.) | Crystallization Temp. (°C.) | Solution Viscosity IV |
|---|---|---|---|---|
| Example 1 | 2.2 | 192.8 | 168.2 | 1.28 |
| Example 2 | 3.5 | 190.9 | 165.3 | 1.25 |
| Example 3 | 1.8 | 190.3 | 169.8 | 1.30 |
| Example 4 | 5.3 | 191.2 | 167.3 | 1.22 |
| Example 5 | 7.0 | 189.3 | 158.9 | 1.20 |
| C. Example 1 | 18.5 | 194.5 | 130.3 | 1.35 |
| C. Example 2 | 12.5 | 192.8 | 145.7 | 1.32 |
| C. Example 3 | 14.5 | 193.5 | 140.2 | 1.33 |

*230° C./2.16 kg

What is claimed is:

1. A method for the preparation of a polyetherester elastomer comprising:

admixing:

an ester, of a dibasic acid and an alcohol having the formula:

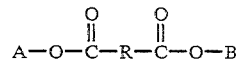

wherein A and B are radicals obtained by removing the hydroxyl group from an esterifying alcohols which may be the same or different, and R is a biradical obtained by removing carboxyl groups from a dicarboxylic acid having a molecular weight of not more than 400, with a short chain diol, and with a long chain polyglycol to form a first mixture;

adding an alkali metal salt of a dialkylsulfoisophthalate to said first mixture to form a second mixture;

polymerization reacting together the contents of said second mixture under conditions sufficient to cleave and remove from said second mixture up to about 70% of said esterifying alcohol to form a polyetherester having units corresponding to the following formulas (I) and (II):

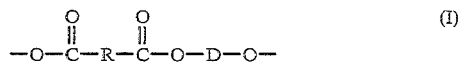

and

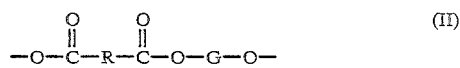

wherein R has the meaning set forth hereinabove, D is a biradical obtained by removing terminal hydroxyl groups from said short chain diol having a molecular weight of not more than about 250, and G is a biradical obtained by removing terminal hydroxyl groups from said long chain ether polyglycol having a molecular weight of about 400 to 4,000;

adding a stabilizing agent to said polyetherester in an amount sufficient to stop said polymerization reaction; and then blending the resultant stabilized polyetherester with an alkali metal salt of a phenol.

2. A method according to claim 1, wherein the long chain ether monomers amount to about 10 to 75 percent by weight of the polyether-ester elastomer.

3. A method according to claim 1, wherein the alkali metal salt of dialkylsulfoisophthalate is represented by the following general formula (III):

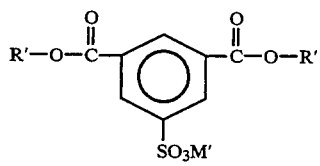 (III)

wherein R' is an alkyl having 1 to 4 carbon atoms, and M' is an alkali metal.

4. A method according to claim 1, wherein the alkali metal salt of dialkylsulfoisophthalate is present in a concentration of about 0.1 to 10 mol % as based on the amount of dibasic acid of the polyether-ester elastomer.

5. A method according to claim 1, wherein the alkali metal salt of a phenol is represented by the following general formula (IV):

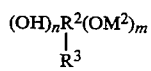 (IV)

wherein $R^2$ is an aromatic radical derived from a compound selected from the group consisting of benzene, naphthalene, anthracene and phenanthrene or a compound in which an aromatic compound is directly bonded to a benzene ring, m and n are each an integer of up to 5, respectively, and the sum thereof, is not higher than 5, $R^3$ is a substituent for at least one hydrogen of $R^2$, and $R^3$ comprises an alkyl group having 1-10 carbon atoms, an aryl having 5-12 carbon atoms or a halogen, and $M^2$ is an alkali metal.

6. A method according to claim 1, wherein the phenolic alkali metal salt is present in a concentration of about 0.05 to 10% by weight based on the total weight of elastomer.

7. A method as claimed in claim 3, wherein said alkali metal is at least one of lithium, sodium, potassium, rubidium or cesium.

8. A method as claimed in claim 3 wherein said alkali metal salt is sodium.

* * * * *